(12) United States Patent
Nishikawa et al.

(10) Patent No.: US 10,797,541 B2
(45) Date of Patent: Oct. 6, 2020

(54) MAGNETIC PLATE LAMINATE, MANUFACTURING METHOD THEREFOR, AND MOTOR USING THIS LAMINATE

(71) Applicant: PANASONIC CORPORATION, Osaka (JP)

(72) Inventors: Yukio Nishikawa, Osaka (JP); Mituhiro Ikeda, Hyogo (JP); Naoki Nojiri, Osaka (JP)

(73) Assignee: PANASONIC CORPORATION, Osaka (JP)

(*) Notice: Subject to any disclaimer, the term of this patent is extended or adjusted under 35 U.S.C. 154(b) by 0 days.

(21) Appl. No.: 16/240,015

(22) Filed: Jan. 4, 2019

(65) Prior Publication Data

US 2019/0157921 A1    May 23, 2019

Related U.S. Application Data

(63) Continuation of application No. PCT/JP2017/023005, filed on Jun. 22, 2017.

(30) Foreign Application Priority Data

Jul. 6, 2016   (JP) .................................. 2016-133842

(51) Int. Cl.
| | | |
|---|---|---|
| *H02K 1/18* | (2006.01) | |
| *H02K 1/14* | (2006.01) | |
| *H02K 15/02* | (2006.01) | |

(52) U.S. Cl.
CPC ............. *H02K 1/185* (2013.01); *H02K 1/146* (2013.01); *H02K 15/02* (2013.01); *H02K 15/022* (2013.01); *H02K 2201/09* (2013.01)

(58) Field of Classification Search
CPC ...... H02K 15/02; H02K 15/022; H02K 1/146; H02K 1/185; H02K 2201/09
(Continued)

(56) References Cited

U.S. PATENT DOCUMENTS 6,034,461 A * 3/2000 Sun ....................... H02K 1/148
                                                         310/179
2004/0150285 A1   8/2004 Decristofaro et al.
(Continued)

FOREIGN PATENT DOCUMENTS

| CN | 102361374 A | 2/2012 |
|---|---|---|
| CN | 102868241 A | 1/2013 |

(Continued)

OTHER PUBLICATIONS

Translation of foreign document JP 49085502 A (Year: 1974).*
(Continued)

*Primary Examiner* — Alex W Mok
(74) *Attorney, Agent, or Firm* — McDermott Will & Emery LLP

(57) ABSTRACT

Provided is a magnetic plate laminate comprising a laminate formed by stacking a plurality of thin strips, and fastening members provided in apertures in the laminate. Also provided is a method for manufacturing a magnetic laminate wherein the thin strips are amorphous thin strips and the magnetic body laminate is subjected to heat treatment, thereby forming nano-crystalline grains in the thin strips. Also provided is a motor equipped with a stator formed by stacking a plurality of the magnetic plate laminates, a securing plate for securing the stator, and a rotor arranged in an opening in the middle of the stator.

11 Claims, 14 Drawing Sheets

(58) Field of Classification Search
USPC .................................................. 310/216.009
See application file for complete search history.

(56) References Cited

U.S. PATENT DOCUMENTS

| | | |
|---|---|---|
| 2004/0174086 A1 | 9/2004 | White et al. |
| 2004/0212269 A1 | 10/2004 | Decristofaro et al. |
| 2005/0006965 A1* | 1/2005 | Sato .................. G11B 19/2009 310/67 R |
| 2008/0054751 A1* | 3/2008 | Hoshino .............. H02K 15/022 310/216.114 |
| 2008/0174200 A1* | 7/2008 | Okamoto ............... H02K 15/02 310/216.018 |
| 2008/0231138 A1* | 9/2008 | Onimaru ................. H02K 1/06 310/216.018 |
| 2009/0072655 A1* | 3/2009 | Sano ..................... H02K 1/185 310/216.016 |
| 2015/0097462 A1 | 4/2015 | Fukumoto et al. |
| 2016/0079817 A1 | 3/2016 | Hayashi et al. |

FOREIGN PATENT DOCUMENTS

| | | |
|---|---|---|
| DE | 18 08 577 A1 | 8/1969 |
| DE | 11 2014 000596 T5 | 1/2016 |
| JP | 49-085502 A | 8/1974 |
| JP | S61-123672 U | 8/1986 |
| JP | S61-258655 A | 11/1986 |
| JP | S61-205241 U | 12/1986 |
| JP | 06-145917 A | 5/1994 |
| JP | H11-266555 A | 9/1999 |
| JP | 2000-270505 A | 9/2000 |
| JP | 2007-311652 A | 11/2007 |
| JP | 2009-219309 A | 9/2009 |
| JP | 2011-019400 A | 1/2011 |
| JP | 2011-078167 A | 4/2011 |
| WO | 99/27633 A1 | 6/1999 |
| WO | 2014/024988 A1 | 2/2014 |
| WO | 2015/159322 A1 | 10/2015 |
| WO | 2016/035191 A1 | 3/2016 |

OTHER PUBLICATIONS

Extended European Search Report dated Jun. 13, 2019 issued in corresponding European Patent Application No. 17824024.8.
International Search Report and Written Opinion issued in International Patent Application No. PCT/JP2017/023005, dated Sep. 19, 2017; with English translation.
English translation of Search Report dated Feb. 3, 2020, issued in the corresponding Chinese Patent Application 201780040568.8.

* cited by examiner

MAGNETIC PLATE LAMINATE, MANUFACTURING METHOD THEREFOR, AND MOTOR USING THIS LAMINATE

CROSS-REFERENCE OF RELATED APPLICATIONS

This application is a Continuation of International Patent Application No. PCT/JP2017/023005, filed on Jun. 22, 2017, which in turn claims the benefit of Japanese Application No. 2016-133842, filed on Jul. 6, 2016, the entire disclosures of which Applications are incorporated by reference herein.

TECHNICAL FIELD

The present invention relates to a magnetic-plate laminate formed by laminating soft magnetic thin strips, and also to a motor which uses this laminate as a stator.

BACKGROUND ART

Pure iron and electromagnetic steel plates are used for magnetic plates of iron cores (stators) for conventional motors. Furthermore, for a motor which aims higher efficiency, thin strips having an amorphous property or nanocrystal grains are used for an iron core (see, for example, Patent Literature (hereinafter, referred to as "PTL") 1). The stator iron core according to PTL 1 is formed by machining first the amorphous alloy thin strips made by a liquid quenching method such as a single roll technique or a twin roll technique in a predetermined shape by a method such as winding, cutting, punching and etching.

By contrast with this, FIG. 16 illustrates a perspective view of an amorphous lamination member 51 according to PTL 2. The lamination member 51 is manufactured by overlapping, from upper and lower sides, electromagnetic steel plates 53 on a plurality of sheets of the amorphous alloy thin strips 52 to which an adhesive has been applied, and heating and pressure-bonding the amorphous alloy thin strips 52. Consequently, handling is easy.

CITATION LIST

Patent Literature

PTL 1
Japanese Patent Application Laid-Open No. H06-145917
PTL 2
Japanese Patent Application Laid-Open No. 2007-311652

SUMMARY OF INVENTION

Technical Problem

However, according to a configuration in PTL 1, when amorphous or crystallized soft magnetic thin strips are laminated to make parts such as iron cores, the thin strips are processed one by one. Therefore, the number of times of processing for each process performed until the thin belts reach a predetermined lamination thickness increases many times, and productivity is low.

Furthermore, according to a configuration in PTL 2 in FIG. 16, the adhesive enters between the layers of the amorphous thin strips, and therefore there are problems that a space factor is poor and motor efficiency becomes poor.

The present invention solves the conventional problems, and an object of the present invention is to provide a magnetic-plate laminate which has high productivity without impairing magnetic characteristics, and a motor which uses this laminate.

Solution to Problem

To achieve the above object, there is used A magnetic-plate laminate, including: a laminate in which a plurality of thin strips are laminated; and a fastening member that is provided in an opening of the laminate. Furthermore, there is used a method for manufacturing the magnetic-plate laminate, in which the magnetic-plate laminate in which the thin strips are amorphous thin strips is thermally processed to cause the stripes to have a nanocrystal grain. There is used a motor, including: a stator in which a plurality of the magnetic-plate laminates are laminated; a fixing plate that fixes the stator; and a rotor that is disposed in an opening at a center of the stator.

A magnetic-plate laminate according to the present invention can simultaneously handle a plurality of positioned thin strips and, consequently, not only has high productivity but also does not include a material which decreases a ratio of a magnetic member in a unit volume such as an adhesive between layers, therefore has a high space factor and can prevent a decrease in magnetic characteristics.

As a result, the magnetic-plate laminate according to the present invention has high productivity without impairing magnetic characteristics.

DESCRIPTION OF EMBODIMENTS

Figure 1A:
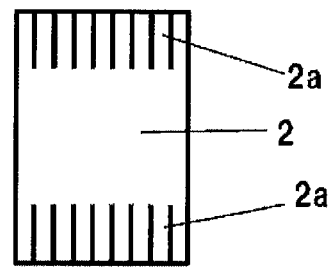
FIG. 1A is a side view of a fastening member which fastens a laminate according to Embodiment 1.

A magnetic-plate laminate and a motor according to embodiments will be described below with reference to the accompanying drawings. In addition, the substantially same components in the drawings will be assigned the same reference numerals.

Embodiment 1

Figure 1B:
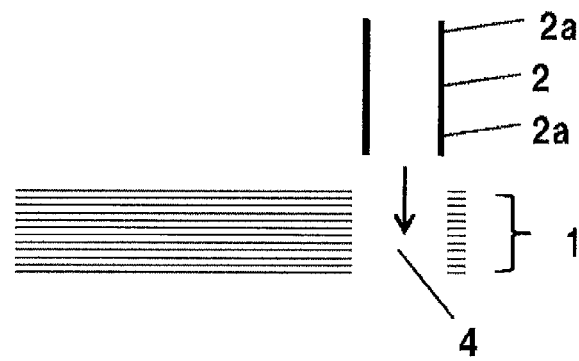
FIG. 1B is a broken cross-sectional view illustrating a manufacturing process of a magnetic-plate laminate for which an eyelet structure is used according to Embodiment 1.
Figure 1C:
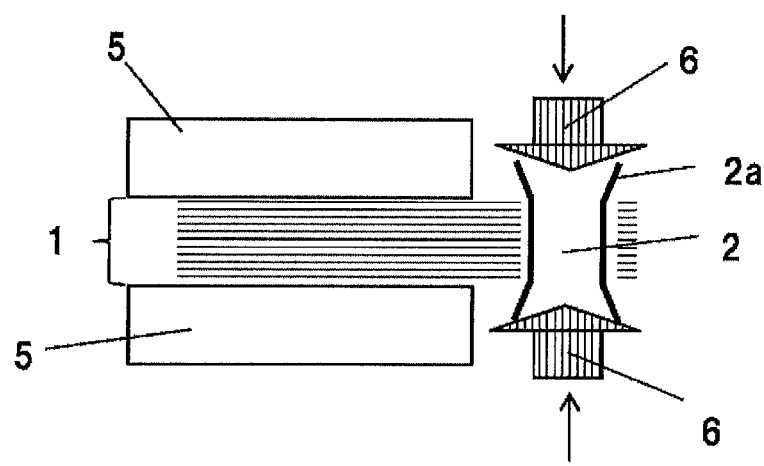
FIG. 1C is a broken cross-sectional view illustrating the manufacturing process of the magnetic-plate laminate for which the eyelet structure is used according to Embodiment 1.
Figure 1D:
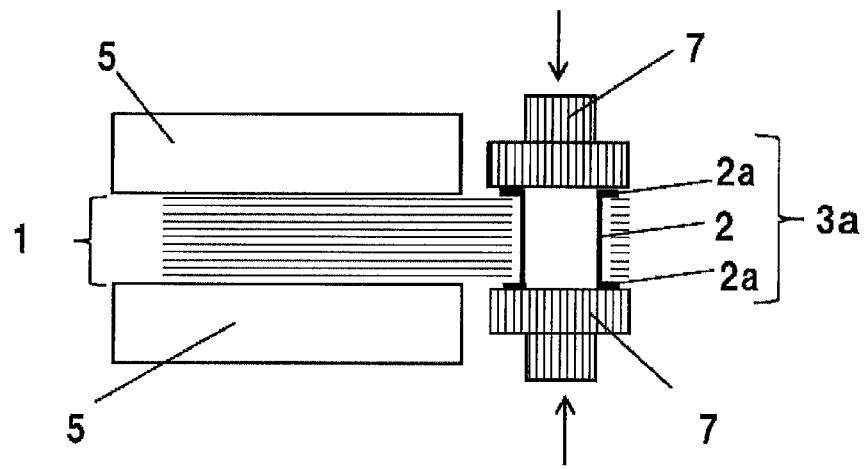
FIG. 1D is a broken cross-sectional view illustrating the manufacturing process of the magnetic-plate laminate for which the eyelet structure is used according to Embodiment 1.

FIG. 1A is a side view of fastening member 100a which fastens magnetic-plate laminate 1. FIGS. 1B to 1D are schematic views illustrating a manufacturing process of magnetic-plate laminate 1 according to Embodiment 1, and, more specifically, illustrate that an eyelet structure is used as a metal fastening mechanism.

<Eyelet Structure 3a>

Fastening member 100a includes a plurality of planar portions 2a which are partitioned by cuts at both ends of hollow cylinder 2. In this regard, eyelet structure 3a is a structure that planar portions 2a are located at the both ends of hollow cylinder 2 in a vertical direction of the cylinder. Eyelet structure 3a is fitted in opening 4 formed in magnetic-plate laminate 1 formed by laminating thin strips which are magnetic bodies. Eyelet structure 3a includes planar portions 2a at the both ends of hollow cylinder 2 so as not to be detached easily from opening 4. As a result, eyelet structure 3a can collectively fix magnetic-plate laminate 1 formed by laminating a plurality of thin strips. Furthermore, eyelet structure 3a is also referred to as a grommet or an eyelet. In addition, hollow cylinder 2 may be a columnar type or a polygonal columnar shape.

FIGS. 1B to 1D illustrate laminate 1, hollow cylinder 2, planar portions 2a formed at cuts on hollow cylinder 2, and opening 4 formed in magnetic-plate laminate 1. Opening 4 is a hole which penetrates magnetic-plate laminate 1. The fastening member in FIG. 1A is inserted in this opening 4.

<Process>

First, in FIG. 1B, the fastening member in FIG. 1B including hollow cylinder 2 and planar portions 2a is inserted in opening 4 of magnetic-plate laminate 1 in an arrow direction.

Next, in FIG. 1C, laminated magnetic-plate laminate 1 is fixed by pressing mechanisms 5, and eyelet fittings 6 are butted from upper and lower sides in arrow directions to push open planar portions 2a.

Furthermore, in FIG. 1D, compressing fittings 7 perform compression from the arrow directions (from the upper and lower sides) to make planar portions 2a face left and right directions to form eyelet structure 3a. The compression may be height regulation which can keep the fixed height of the eyelet, or pressure regulation which can make the eyelet firm.

Figure 2:
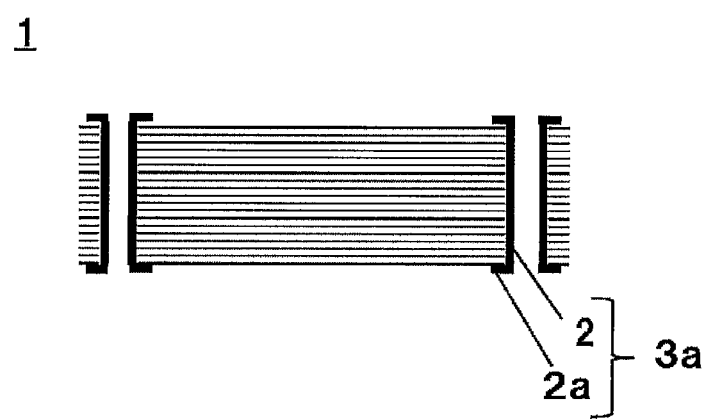
FIG. 2 is a broken cross-sectional view illustrating a state where the laminated laminate is fixed by eyelet members according to Embodiment 2.

FIG. 2 is a cross-sectional view illustrating a state where laminated magnetic-plate laminate 1 is fixed by eyelet structures 3a.

<Magnetic-Plate Laminate>

Magnetic-plate laminate 1 is formed by laminating the thin strips. In this case, the thin strip is an amorphous magnetic plate. The plate thickness of the thin strip obtained in an amorphous state is usually between 10 and 100 µm. Furthermore, the thin strip may be an amorphous thin strip crystallized by heat processing.

<Material of Fastening Member 100a>

A material of fastening member 100a is desirably a non-magnetic material which is not influenced by a magnetic field from a viewpoint that this material does not influence magnetic characteristics of magnetic-plate laminate 1. As this non-magnetic material, an iron-based material such as austenitic stainless steel, or a non-ferrous metal such as a cooper, a copper-based alloy such as brass, aluminum or an aluminum alloy, or an alloy of these metal can be used.

Eyelet structure 3a of fastening member 100a made of brass fixes 30 sheets of amorphous thin strips (thin strips) to handle as one magnetic-plate laminate 1. The thicknesses of upper and lower planar portions 2a of eyelet structure 3a are 60 µm in total, and, when the thickness of the thin strip (thin strip) is 30 µm, a space factor indicating occupation of the thin strips in a lamination thickness direction is approximately 94%. As the plate thicknesses and the number of sheets of the thin strips are larger and planar portions 2a are thinner, the space factor is higher. A lamination thickness limit of the thin strips depends on eyelet structure 3a, and, as the lamination thickness is thicker, planar portions 2a and thicker eyelet structure 3a are necessary.

Eyelet structure 3a may be formed in magnetic-plate laminate 1 of the crystallized thin strips or eyelet structure 3a may be formed in magnetic-plate laminate 1 of the amorphous thin strips, then be thermally processed and crystallized.

A crystallization temperature varies based on a composition and is usually between 350° C. and 500° C., and when a nanocrystal grain whose diameter is several 10 nm or less is included in the thin strip, the thin strip has better soft magnetic characteristics than an amorphous member.

In addition, when crystallized from the amorphous state, the thin strip becomes fragile, and therefore when eyelet structure 3a is formed after the crystallization, it is necessary to pay attention not to break the thin strips.

On the other hand, when an amorphous thin strip group is thermally processed after formation of eyelet structure 3a, it is preferable to make a thermal gradient in a lamination direction small and make a heat processing temperature distribution in the lamination direction uniform. Furthermore, the quantity of heat of self-heating when the thin strips are crystallized from the amorphous state accumulates at a lamination center portion, and a temperature excessively rises. On the other hand, the quantity of heat of self-heating of the thin strips is correlated with the thickness. In view of this, the thickness of magnetic-plate laminate 1 is preferably the thickness equal to or less than 2.5 mm to suppress the excessive temperature rise. This shows that desired magnetic characteristics can be obtained. In this case, some of laminates 1 can be laminated to form one thick magnetic-plate laminate 1.

When the entire thickness of magnetic-plate laminate 1 is 2.5 mm, and the plate thickness of one sheet of a thin strip is minimum 10 µm, 250 sheets of thin strips need to be laminated at maximum. Furthermore, a plurality of sheets of thin strips is laminated and manufactured to enhance productivity. The entire thickness in a case of two sheets of the laminated thin strips is 0.02 mm since the plate thickness of the thin strip is 10 µm.

When the above material is used as the material of fastening member 100a, even if the thin strips are thermally processed and crystallized, eyelet structure 3a does not melt.

This eyelet structure 3a makes it easy to transfer heat in the lamination direction of magnetic-plate laminate 1 and contributes to making the temperature gradient in the lamination direction small.

Furthermore, it is desirable to leave a trace of a heat effect such as an oxide on a surface of eyelet structure 3a. A layer of the oxide has an insulation property, and consequently contributes to preventing electrical short-circuiting between laminated magnetic-plate laminate 1 and eyelet structure 3a, and can reduce energy loss due to eddy current loss caused by short-circuiting in a magnetic device such as a motor.

Embodiment 2

Figure 3:
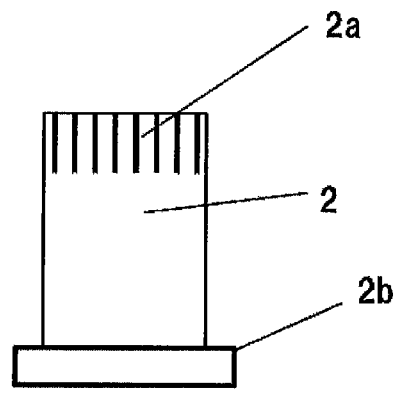
FIG. 3 is an external outlook view of the eyelet member of the magnetic-plate laminate according to Embodiment 2.

FIG. 3 is an external outlook view of fastening member 100b according to Embodiment 2. A difference of FIG. 3 from fastening member 100a in FIG. 1A is that planar portion 2b is vertically bent on one side from hollow cylinder 2 from the beginning Planar portions 2a are disposed in parallel to hollow cylinder 2 on the other side. Thus, there is an advantage that it is easy to position the fastening member in a thickness direction of magnetic-plate laminate 1. A formation process of eyelet structure 3a and a shape after formation of eyelet structure 3a are equivalent to those in FIGS. 1D and 2. Matters which are not described are the same as those in Embodiment 1.

Embodiment 3

Figure 4A:
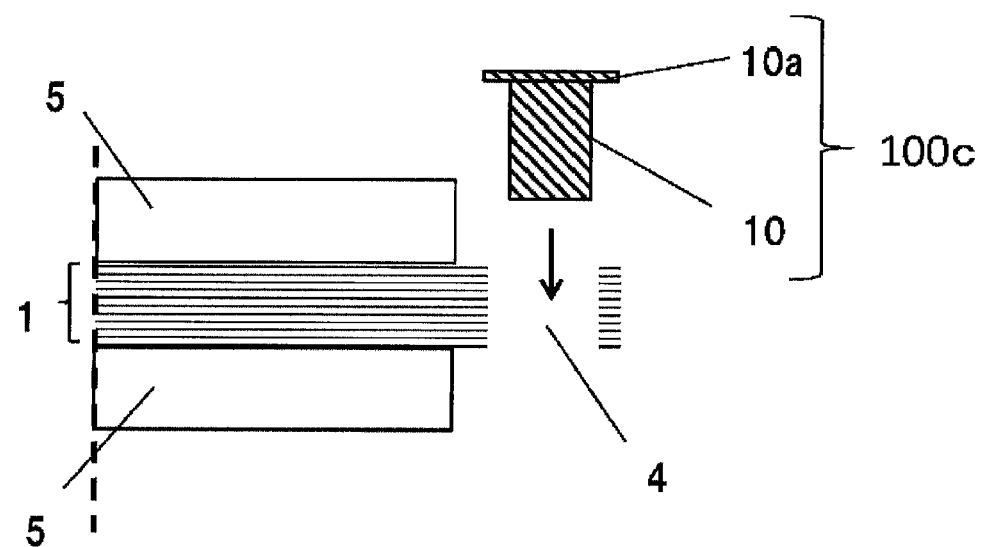
FIG. 4A is a broken cross-sectional view illustrating the manufacturing process of the magnetic-plate laminate according to Embodiment 3.
Figure 4B:
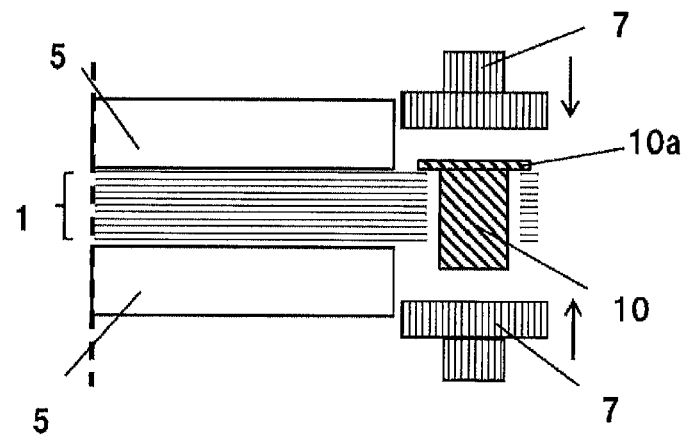
FIG. 4B is a broken cross-sectional view illustrating the manufacturing process of the magnetic-plate laminate according to Embodiment 3.
Figure 4C:
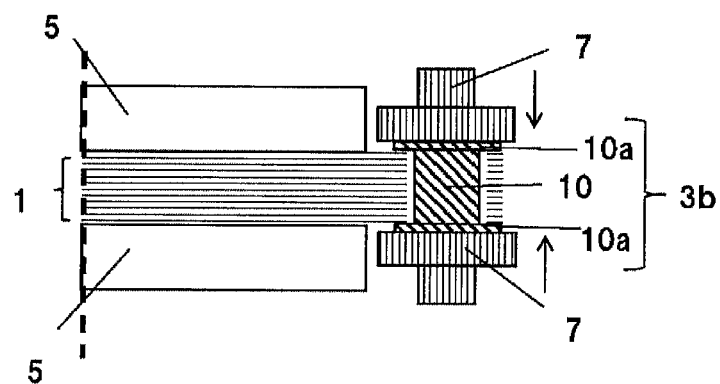
FIG. 4C is a broken cross-sectional view illustrating the manufacturing process of the 1 magnetic-plate laminate according to Embodiment 3.

FIGS. 4A to 4C are schematic views illustrating a manufacturing process of magnetic-plate laminate 1 of a magnetic plate according to Embodiment 3. More specifically, FIGS. 4A to 4C illustrate that fastening member 100c is used for a metal fastening mechanism, and caulking structure 3b is formed.

In this regard, a through-hole is not made in caulking structure 3b unlike eyelet structure 3a, and therefore planar portions 10a are located at both ends of solid columnar body 10 in this structure. One end widens as planar portions 10a to intend to collectively fix the laminated thin strips. Instead of a plurality of planar portions 10a, one planar portion 10a is formed unlike planar portions 2a and 2b. In this regard, planar portion 10a may be divided into several portions. Matters which are not described are the same as those in Embodiment 1.

A difference of FIGS. 4A to 4C from FIGS. 1B to 1D is that fastening member 100c is used. In FIG. 4A, fastening member 100c is inserted in opening 4 of laminated magnetic-plate laminate 1 in an arrow direction.

In FIG. 4B, fastening member 100c is fixed by pressing mechanisms 5, and compressing fittings 7 are butted from upper and lower sides in arrow directions.

Furthermore, in FIG. 4C, compressing fittings 7 can compress columnar body 10 in the arrow directions to form planar portions 10a on the upper and lower sides of columnar body 10 in a vertical direction and form caulking structure 3b.

Figure 5:
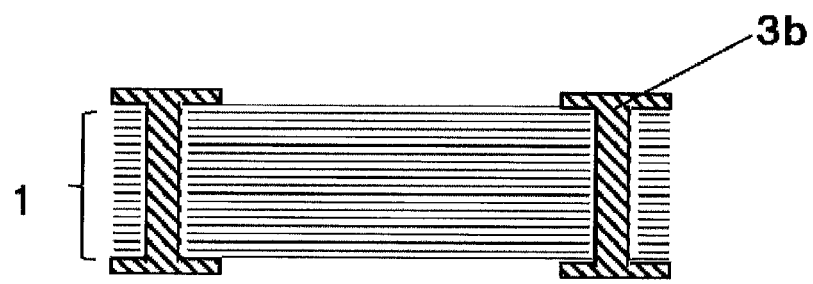
FIG. 5 is a broken cross-sectional view illustrating a state where the laminated laminate is fixed by the caulking members according to Embodiment 3.

FIG. 5 is a cross-sectional view illustrating a state where laminated magnetic-plate laminate 1 is fixed by caulking structure 3b. A material of fastening member 100c which forms caulking structure 3b is desirably a non-magnetic material which is not influenced by a magnetic field from a viewpoint that this material does not influence magnetic characteristics of magnetic-plate laminate 1 similar to eyelet structure 3a. This is similar to Embodiment 1, and, for the material of fastening member 100c which forms caulking structure 3b, an iron-based material such as austenitic stainless steel, or a non-ferrous metal such as a cooper, a copper-based alloy such as brass, aluminum or an aluminum alloy, or an alloy of these can be used.

Embodiment 4

Figure 6A:
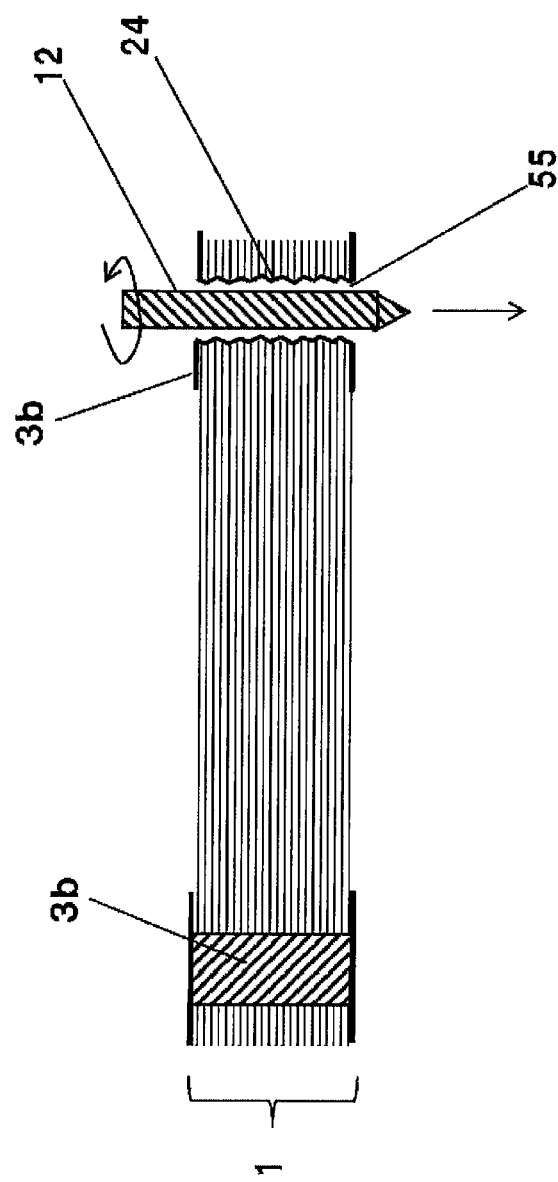
FIG. 6A is a broken cross-sectional view illustrating a process of forming the eyelet structures of the magnetic-plate laminate according to Embodiment 4.
Figure 6B:
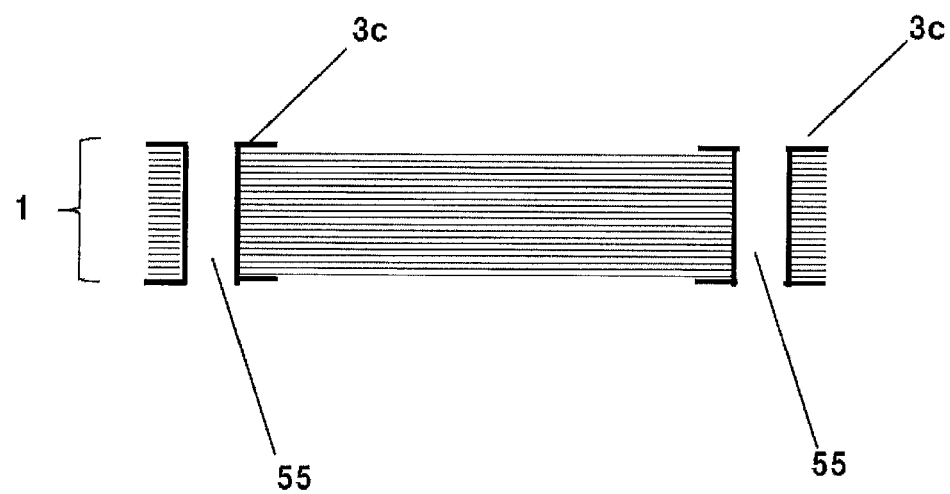
FIG. 6B is a broken cross-sectional view illustrating a process of forming the eyelet structures of the magnetic-plate laminate according to Embodiment 4.

FIGS. 6A and 6B are schematic views illustrating a process of forming eyelet structures 3c of magnetic-plate laminate 1 of a magnetic plate according to Embodiment 4. In FIG. 6A, opening 55 is made by drill 12 at an axial center of one of two caulking structures 3b formed in laminated magnetic-plate laminate 1. In FIG. 6B, when openings 55 are made at two portions, eyelet structures 3c are formed. In this case, a cutting mark (irregularity 24) is left in the inner wall of the opening of eyelet structure 3c. Irregularity 24 is preferably 10 nm or more.

Thus, matters which can be changed from caulking structure 3b to eyelet structure 3c in the same process and are not described are the same as those in the above embodiments.

(Embodiment 5) Caulking Manufacturing Method

Figure 7A:
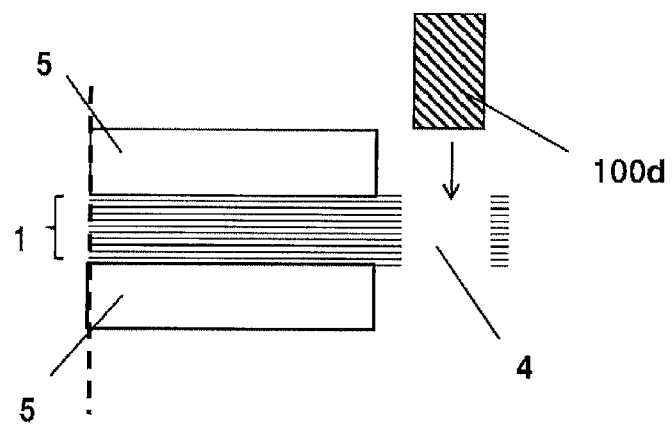
FIG. 7A is a broken cross-sectional view illustrating the manufacturing process of the magnetic-plate laminate for which a caulking structure is used according to Embodiment 5.
Figure 7B:
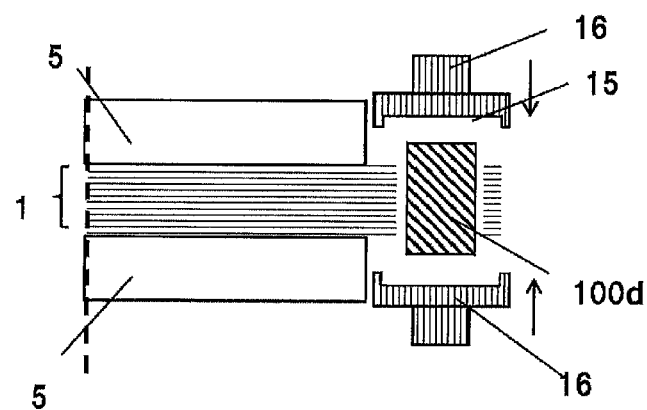
FIG. 7B is a broken cross-sectional view illustrating the magnetic-plate laminate for which the caulking structure is used according to Embodiment 5.
Figure 7C:
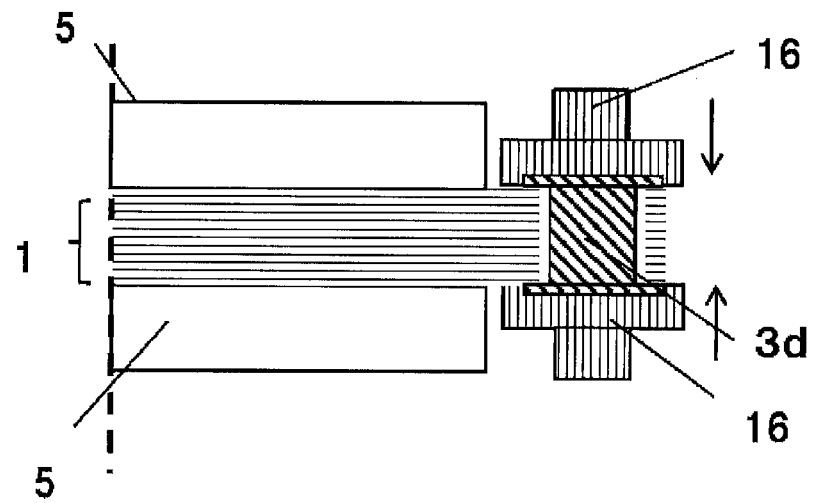
FIG. 7C is a broken cross-sectional view illustrating the manufacturing process of the magnetic-plate laminate for which the caulking structure is used according to Embodiment 5.

FIGS. 7A to 7C are schematic views illustrating a manufacturing process of magnetic-plate laminate 1 according to Embodiment 5, and illustrate magnetic-plate laminate 1 for which caulking structure 3d is used. A difference of FIGS. 7A to 7C from FIGS. 4A to 4C is that a columnar fastening member 100d is used.

In FIG. 7A, fastening member 100d which is longer than the depth of opening 4 and is larger than the volume of opening 4 is inserted in opening 4 of laminated magnetic-plate laminate 1 in an arrow direction.

In FIG. 7B, laminated magnetic-plate laminate 1 is fixed by pressing mechanisms 5, and caulking fittings 16 having counterbored portions 15 are butted from upper and lower sides in arrow directions.

Furthermore, in FIG. 7C, caulking fittings 16 compress fastening member 100*d* in the arrow directions, so that part of fastening member 100*d* plastically flow and is loaded to counterbored portions 15 to form guards on the upper and lower sides and fix laminated magnetic-plate laminate 1 by caulking structure 3*d*. Furthermore, the shape of fastening member 100*d* may be a prismatic shape or a spherical shape other than the columnar shape. Matters which are not described are the same as those in the above embodiments.

Embodiment 6

Figure 8:
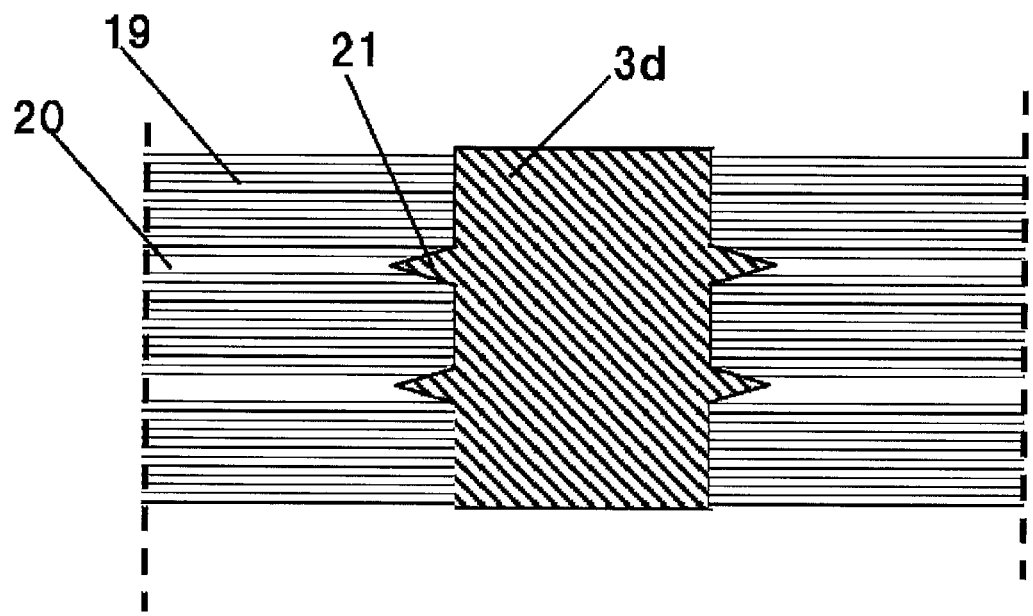
FIG. 8 is an enlarged broken cross-sectional view near the caulking member of the magnetic-plate laminate according to Embodiment 6.

FIG. 8 is an enlarged cross-sectional view near caulking structure 3*d* of magnetic-plate laminate 1 according to Embodiment 6. A non-ferrous material has lower hardness than an iron-based material as a material of caulking structure 3*d*, and can be caulked with a small load.

Particularly when a low melting point alloy such as a solder is used as caulking structure 3*d*, a yield stress is low and a melting point is also low. A heat processing temperature of 350° C. to 500° C. exceeds the melting points of multiple solders, and therefore part of caulking structure 3*d* flows in gaps 20 of thin strips 19, and leaves projection portions 21 of projection shapes. When these projection portions 21 enter between the layers of thin strips 19, there are also advantages that there is little gap in a lamination direction, and a fixing state is more firm. Matters which are not described are the same as those in the above embodiments. Projection portions 21 are located on a side surface of the columnar portion of caulking structure 3*d*. A plurality of projection portions 21 is preferably provided.

An eyelet structure also needs to include these projection portions 21.

Embodiment 7

Figure 9:
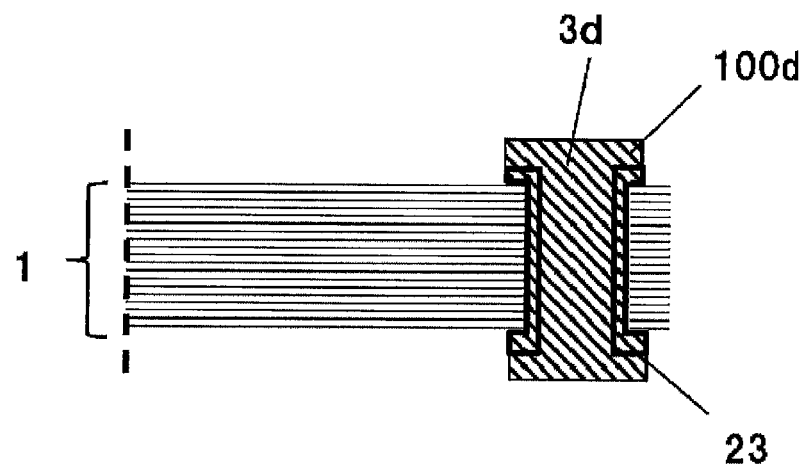
FIG. 9 is an enlarged broken cross-sectional view near the caulking member of the magnetic-plate laminate according to Embodiment 7.

FIG. 9 is an enlarged cross-sectional view near fastening member 100*d* of a magnetic-plate laminate according to Embodiment 7. A difference of fastening member 100*d* in FIG. 9 from caulking structure 3*b* in FIG. 5 is that an outer peripheral portion of fastening member 100*d* is provided with insulation layer 23. In FIG. 7A, by providing insulation layer 23 such as a resin which can deform on an outer peripheral portion of caulking member 14, and performing caulking in the same process as those in FIGS. 7B and 7C, a structure in FIG. 9 can be obtained. By providing insulation layer 23 on outer peripheral of fastening member 100*d*, it is possible to prevent electrical short-circuiting between laminated magnetic-plate laminate 1 and fastening member 100*d*, and reduce energy loss due to eddy current loss caused by short-circuiting in a magnetic device such as a motor. Matters which are not described are the same as those in the above embodiments.

In addition, preferably, above fastening members 100*a* to 100*c* also include insulation layers 23 on outer peripheral surfaces or inner peripheral surfaces of fastening members 100*a* to 100*c* likewise.

Embodiment 8

Figure 10A:
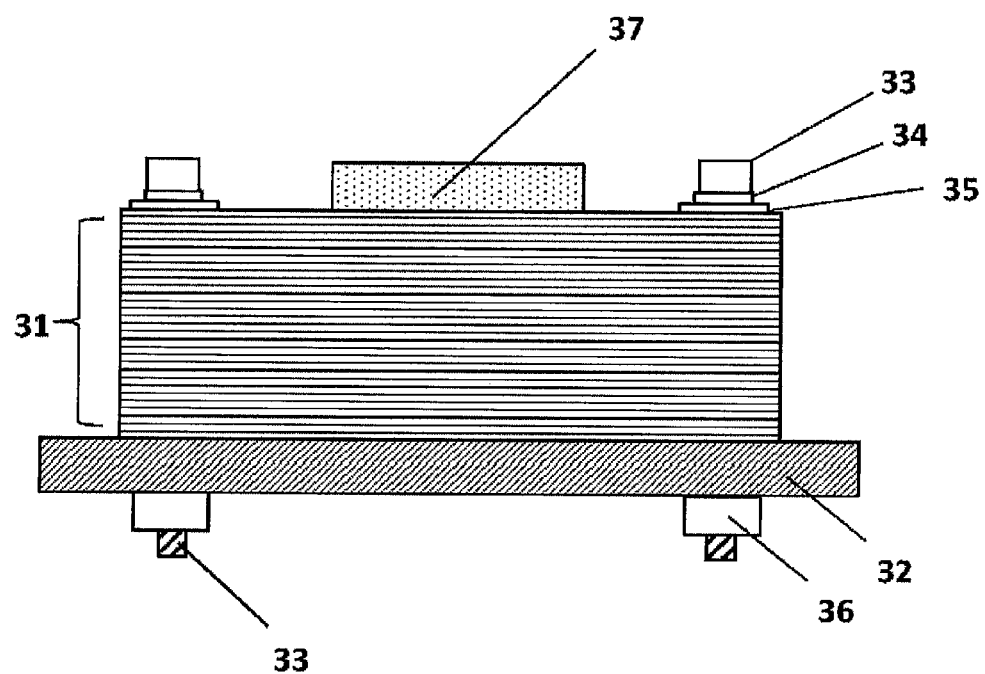
FIG. 10A is a side view of a motor formed by the magnetic-plate laminate according to Embodiment 8.
Figure 10B:
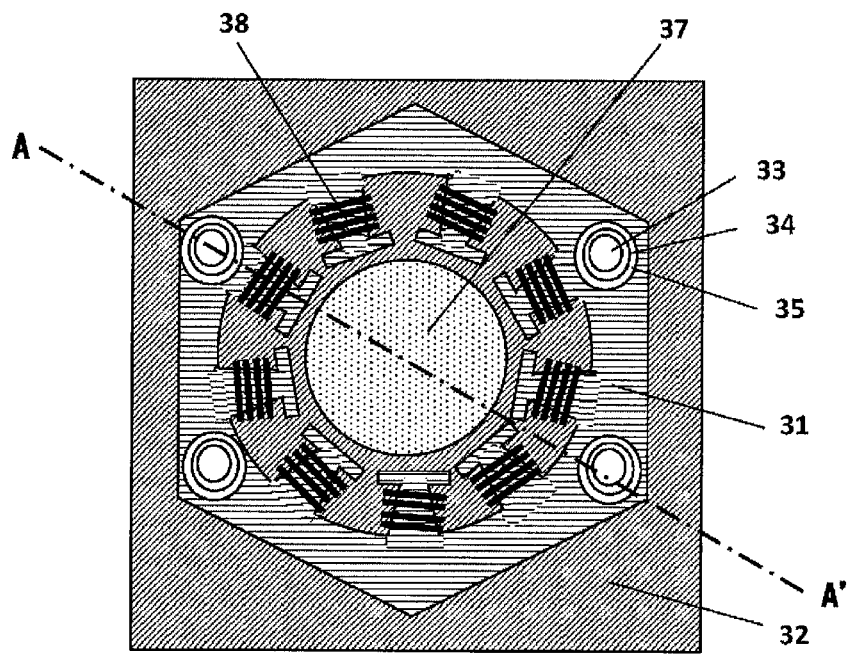
FIG. 10B is a top view of the motor formed by the magnetic-plate laminate according to Embodiment 8.

FIGS. 10A and 10B are external outlook configuration diagrams of a motor formed by magnetic-plate laminate 1 of a magnetic plate according to Embodiment 8. FIG. 10A is a side view of the motor, and FIG. 10B is a top view of the motor.

In FIG. 10A, stator 31 which is a laminated object of thin strips is fixed to fixing plate 32 by bolts 33, spring washers 34, washers 35 and nuts 36. In FIG. 10B, windings 38 are provided to portions which are called teeth (T-shaped protrusion portions) of stator 31. Rotor 37 is installed on an inner diameter side (opening portion) of stator 31.

Figure 11A:
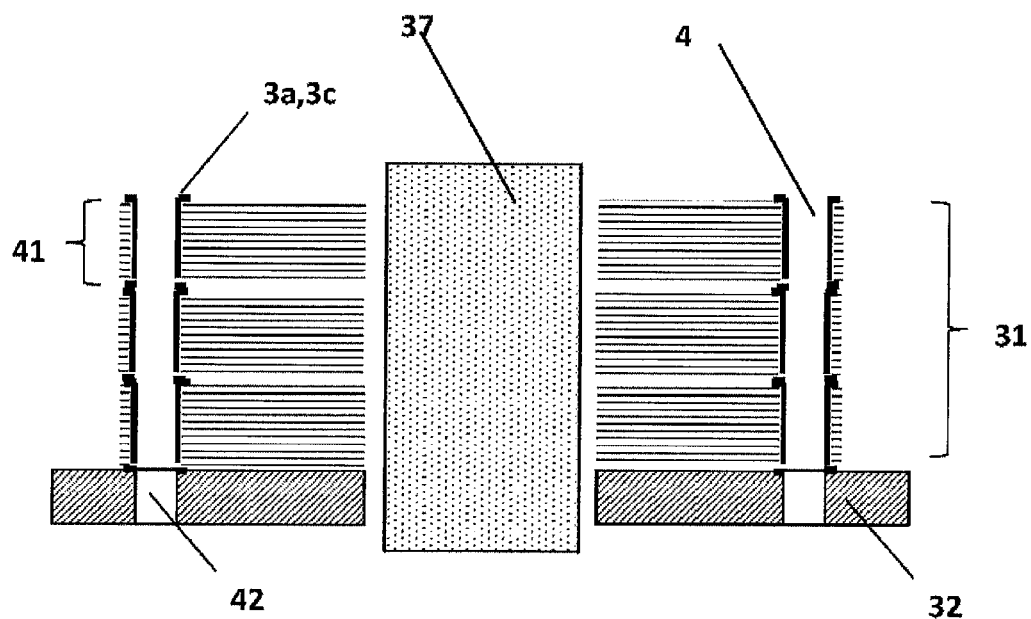
FIG. 11A is a broken cross-sectional view between A and A' in FIG. 10B according to Embodiment 8.
Figure 11B:
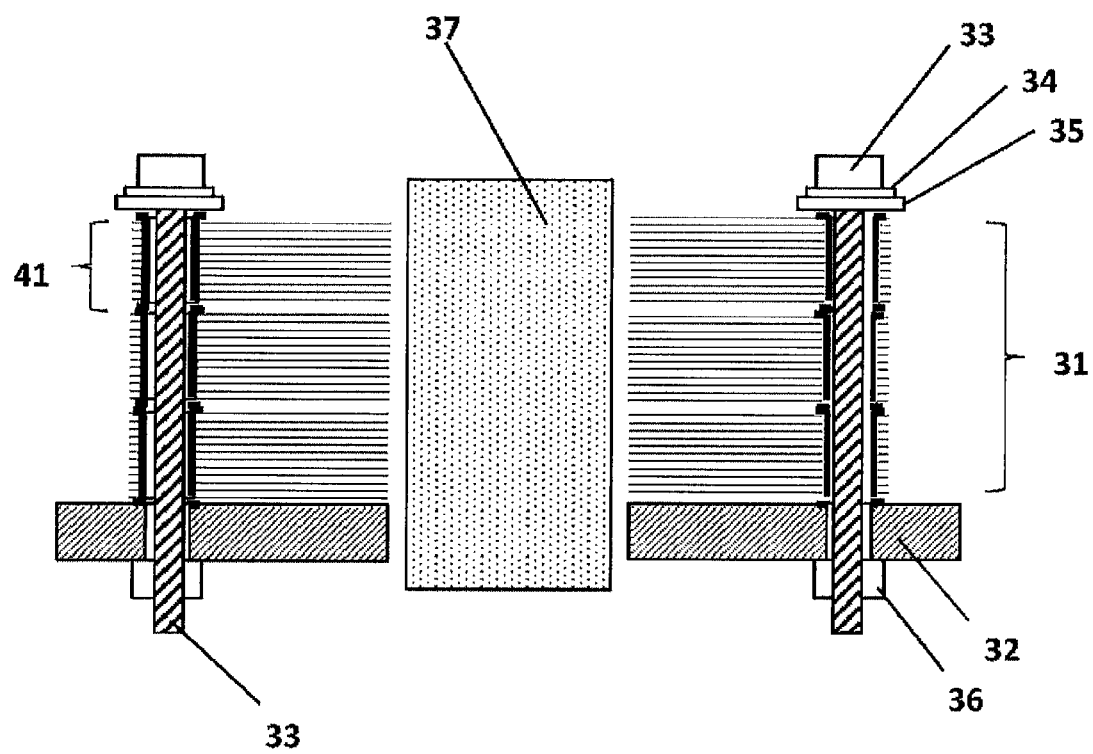
FIG. 11B is a broken cross-sectional view between A and A' in FIG. 10B according to Embodiment 8.

FIGS. 11A and 11B are cross-sectional configuration diagrams between A and A' in FIG. 10B, FIG. 11A illustrates a state without fixing bolts 33 and FIG. 11B illustrates a state with bolts 33.

In FIG. 11A, laminates 41 of eyelet structures 3*a* and 3*c* which form stator 31 are positioned such that portions of eyelet structures 3*a* and 3*c* are stacked on through-hole 42 for fastening fixing plate 32, and are laminated at three stages. Metal fastening mechanisms (openings 4 and fastening members 100*a* and 100*b*) are linearly arranged in a thickness direction of stator 31.

In FIG. 11B, laminates 41 of eyelet structures 3*a* and 3*c* are fixed to fixing plate 32 by bolts 33, spring washers 34, washers 35 and nuts 36. By inserting bolts 33 in eyelet structures 3*a* and 3*c* in openings 4 of laminates 41, it is possible to prevent damages on end surfaces of the thin strips during insertion of the bolts 33. Furthermore, by stacking and laminating eyelet structures 3*a* and 3*c*, fastening pressures of the bolts 33 locally work on the thin strips, so that it is possible to prevent a negative influence on magnetic characteristics of laminates 41.

Laminates 41 are used for stator 31. However, laminates 41 may be used for rotor 37. A motor whose rotor 37 rotates around stator 31 may be used.

Embodiment 9

Figure 12:
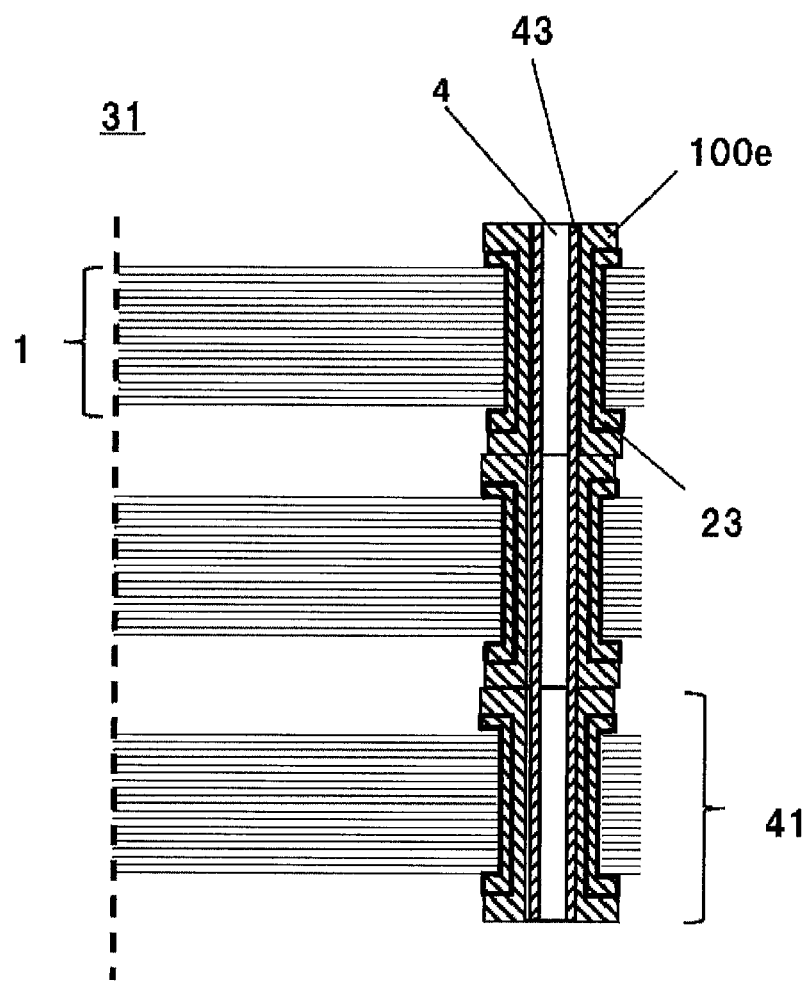
FIG. 12 is an enlarged broken cross-sectional view near the eyelet portions of the magnetic-plate laminate according to Embodiment 9.

FIG. 12 is an enlarged cross-sectional configuration diagram near eyelet structure 3*c* of stator 31 of a motor according to Embodiment 9. Laminates 41 of eyelet structures 3*c* including fastening members 100*e* with insulation layers 23 are laminated at three stages.

Furthermore, adhesive 43 is applied to an inner wall of opening 4 inside fastening member 100*e* to couple laminates 41 of three stages. By adhering laminates 41 of eyelet structures 3*c*, it is possible to handle stator 31 alone even if bolts are not used for fastening, so that handling becomes easier.

Adhesive 43 is used for coupling in FIG. 12. However, fastening members 100*e* may be welded to each other or fastening members 100*e* may be caulked to each other. Matters which are not described are the same as those in Embodiment 8.

Embodiment 10

Figure 13A:
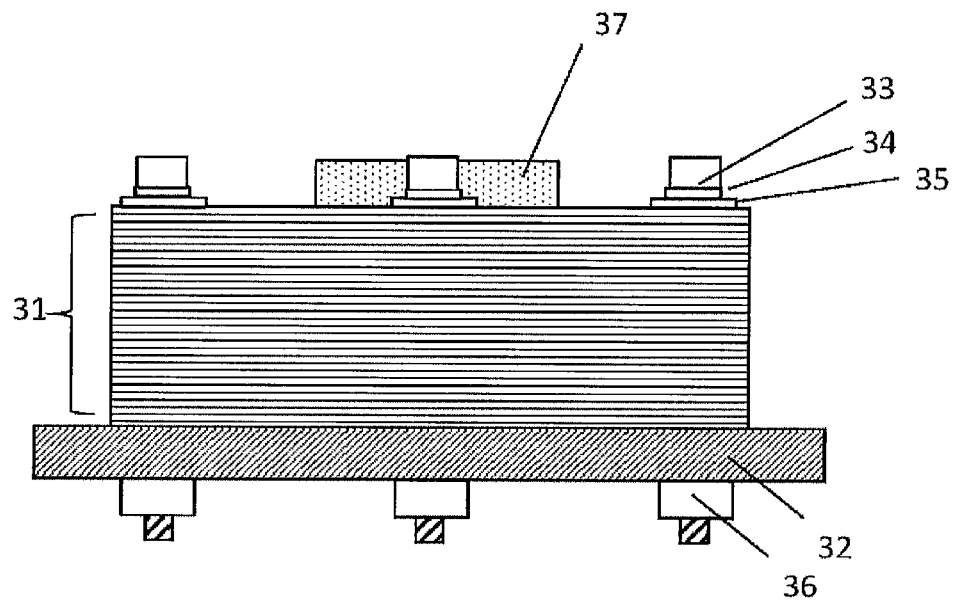
FIG. 13A is a side view of the motor formed by the magnetic-plate laminate according to Embodiment 10.
Figure 13B:
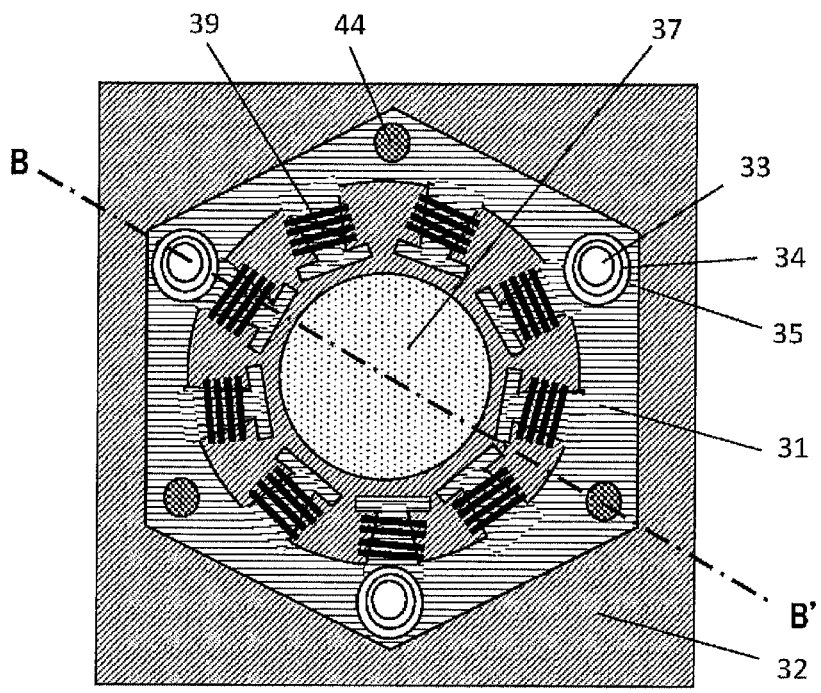
FIG. 13B is a top view of the motor formed by the magnetic-plate laminate according to Embodiment 10.

FIGS. 13A and 13B are external outlook configuration diagrams of a motor formed by a magnetic-plate laminate according to Embodiment 10, FIG. 13A is a side view and FIG. 13B is a top view. The motor in FIGS. 13A and 13B is different from a motor in FIGS. 10A and 10B according to Embodiment 8. Difference points include that (1) stator 31 which is a laminated object of thin strips is fixed at three portions of fixing plate 32 by bolts 33, spring washers 34, washers 35 and nuts 36, and (2) resin portions 44 loaded in openings 4 of the fastening members are provided at three portions. That T-shaped portions which are called teeth of stator 31 are wound by windings 38 and rotor 37 is installed on an inner diameter side of stator 31 is the same as that in FIGS. 10A and 10B.

Figure 14:
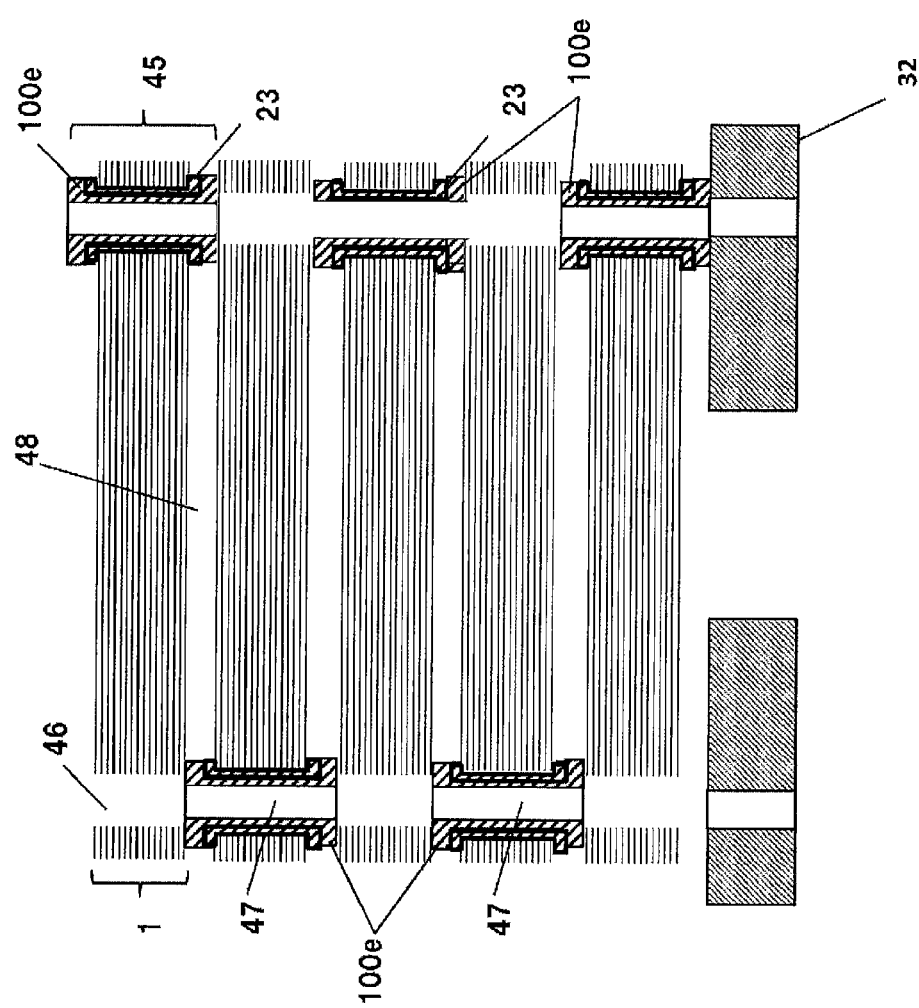
FIG. 14 is a broken cross-sectional view between B and B' in FIG. 13B according to Embodiment 10.

FIG. 14 is a cross-sectional configuration diagram between B and B' in above FIG. 13B, and illustrates a state where laminates 45 of eyelet structures 100a, 100b and 100e are laminated before fixing bolts 33 and resin portions 44 are inserted. Laminates 45 of the eyelet structures which form stator 31 are laminated at five stages such that through-holes 46 and hollow portions 47 of fastening members 100e are alternately stacked. That is, fastening members 100e adjacent on the upper and lower sides are located at different positions in a plan view of stator 31. Alternatively, fastening members 100e adjacent on the upper and lower sides are not combined.

This configuration provides an effect that upper and lower gaps 48 of laminated magnetic-plate laminate 1 narrow and a space factor is high compared to a case where eyelet structures 3a and 3c are stacked and laminated at three states in FIG. 11A in Embodiment 8.

Figure 15:
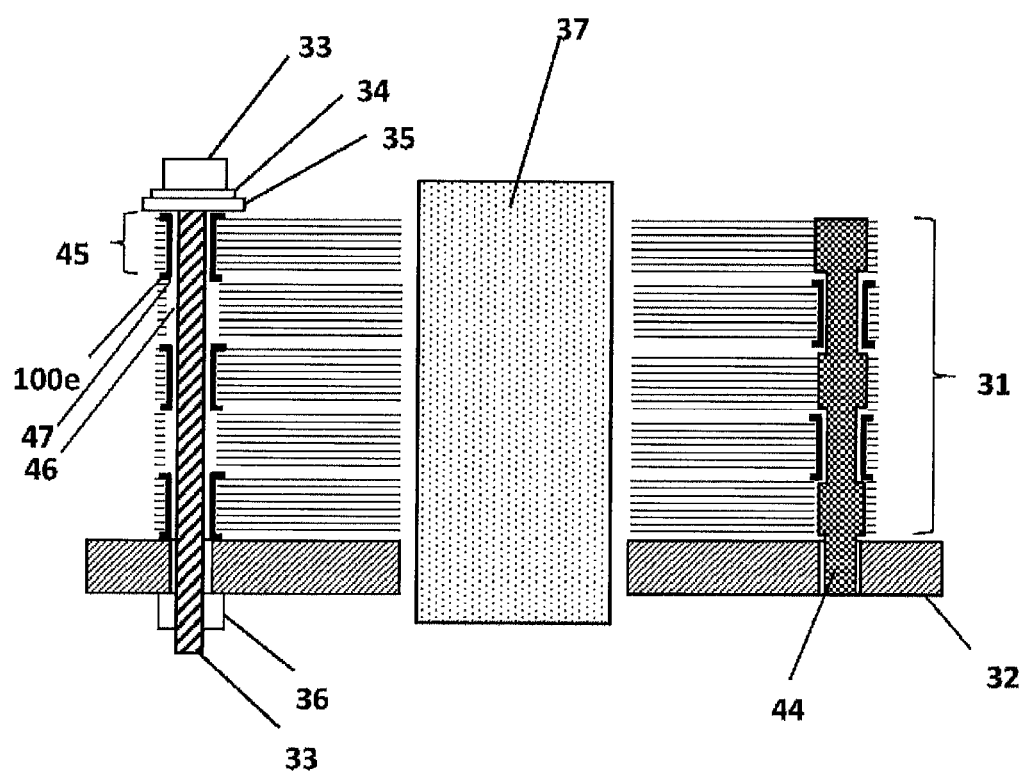
FIG. 15 is a broken cross-sectional view between B and B' in FIG. 13B.
Figure 16:
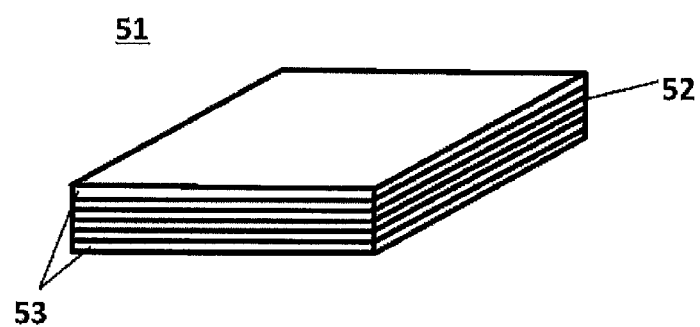
FIG. 16 is a perspective view illustrating a conventional magnetic-plate laminate disclosed in PTL 2.

FIG. 15 is a cross-sectional configuration diagram between B and B' in above FIG. 13B, and illustrates a state where laminates 45 of the eyelet structures are laminated and fixed after fixing bolts 33 and resin portions 44 are inserted. Laminates 45 of the eyelet structures are fixed to fixing plate 32 by bolts 33, spring washers 34, washers 35 and nuts 36 via through-holes 46 and hollow portions 47 of fastening members 100e. Furthermore, resin portions 44 loaded to keep rigidity are formed in laminates 45 in which bolts 33 are not inserted. Even when resin portions 44 are hollow, other materials may be loaded. Matters which are not described are the same as those in Embodiments 8 and 9.

CONCLUSION

The embodiments can be combined. The eyelet members and the caulking members may be columns, columnar cylinders, square columns or elliptical columns.

In addition, the present disclosure includes any combination of optional embodiments and/or examples among the above-described various embodiments and/or examples, and can provide the effects of the respective embodiments and/or examples.

INDUSTRIAL APPLICABILITY

The magnetic-plate laminate according to the present invention can provide the magnetic-plate laminate which has high productivity without impairing magnetic characteristics. Consequently, the magnetic-plate laminate according to the present invention is useful as the stator of the motor. Furthermore, the magnetic-plate laminate according to the present invention is applicable for use in magnetic application electronic parts such as transformers other than motors.

REFERENCE SIGNS LIST

1 Magnetic-plate laminate
2 Hollow cylinder
2a, 2b Planar portion
3a, 3c Eyelet structure
3b, 3d, 3e Caulking structure
4 Opening
5 Pressing mechanism
6 Eyelet fitting
7 Compressing fitting
10 Columnar body
10a Planar portion
12 Drill
15 Counterbored portion
16 Caulking fitting
19 Thin strip
20 Gap
21 Projection portion
23 Insulation layer
24 Irregularity
31 Stator
32 Fixing plate
33 Bolt
34 Spring washer
35 Washer
36 Nut
37 Rotor
38 Winding
41 Laminate
42 Through-hole
43 Adhesive
44 Resin portion
45 Laminate
46 Through-hole
47 Hollow portion
48 Gap
51 Lamination member
52 Amorphous alloy thin strip
53 Electromagnetic steel plate
55 Opening
100a, 100b, 100c, 100d, 100e Fastening member

The invention claimed is:

1. A magnetic-plate laminate, comprising:
   a laminate in which a plurality of thin strips are laminated; and
   a fastening member that is provided in an opening of the laminate, wherein:
   the fastening member includes a hollow cylinder, and a plurality of planar portions which are located at each end of the cylinder, each planar portion having a plate shape and extending from a corresponding end of the cylinder in a vertical direction of the cylinder,
   each thin strip has a thickness of 10 to 100 μm, and
   each thin strip includes an amorphous material.

2. The magnetic-plate laminate according to claim 1, wherein an insulation layer is formed on an inner surface or an outer peripheral surface of the hollow cylinder.

3. The magnetic-plate laminate according to claim 1, wherein a material of the fastening member is non-magnetic.

4. The magnetic-plate laminate according to claim 1, wherein a material of the fastening member is an austenitic iron-based alloy.

5. The magnetic-plate laminate according to claim 1, wherein a material of the fastening member is a nonferrous metal or an alloy of the nonferrous metal.

6. A method for manufacturing the magnetic-plate laminate, wherein the magnetic-plate laminate according to claim 1 in which the thin strips are amorphous thin strips is thermally processed to cause the stripes to have a nanocrystal grain.

7. A magnetic-plate laminate, comprising:
   a laminate in which a plurality of thin strips are laminated; and
   a fastening member that is provided in an opening of the laminate, wherein the fastening member includes a solid or hollow columnar body, and planar portions which are located at both ends of the solid or hollow columnar body, an outer peripheral surface of the solid or hollow columnar body includes a projection portion, wherein the projection portion is located between two surfaces of the plurality of thin strips which surfaces are facing each other in parallel, each thin strip has a thickness of 10 to 100 µm, and each thin strip includes an amorphous material.

8. The magnetic-plate laminate according to claim 7, wherein an insulation layer is formed on the outer peripheral surface of the solid or hollow columnar body.

9. A motor, comprising:
a stator which is a laminate of a plurality of magnetic-plate laminates, each of the magnetic-plate laminates including a laminate of a plurality of thin strips and a fastening member that is provided in an opening of the laminate;
a fixing plate that fixes the stator; and
a rotor that is disposed in an opening at a center of the stator, wherein,
in the stator, the plurality of laminates face each other, and the fastening member is provided in one of the openings of the two facing laminates and is not provided in the opening of the other of the two facing laminates.

10. The motor according to claim 9, wherein
a plurality of openings are provided with the laminate,
the fastening member is provided in at least one of the plurality of openings, and the fastening member is not provided in the remainder of the openings.

11. The motor according to claim 9, wherein
the opening in which the fastening member is provided and the opening in which the fastening member is not provided are alternately arranged in the thickness direction of the stator.

* * * * *